(12) United States Patent
Beifus et al.

(10) Patent No.: US 6,765,361 B1
(45) Date of Patent: Jul. 20, 2004

(54) MOTOR CONTROL CIRCUIT

(75) Inventors: Brian L. Beifus, Fort Wayne, IN (US); Mark A. Brattoli, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,718

(22) Filed: May 24, 2001

(51) Int. Cl.[7] .......................... H02P 1/24; H02P 1/42; H02P 3/18; H02P 5/28; H02P 7/36
(52) U.S. Cl. ............................ 318/727; 318/605
(58) Field of Search ..................... 318/786, 434, 318/654, 690, 691, 605, 661, 727

(56) References Cited

U.S. PATENT DOCUMENTS

| | | | |
|---|---|---|---|
| 3,493,737 A | * 2/1970 | Edelson ..................... 708/809 |
| 3,671,728 A | * 6/1972 | Day et al. .................... 318/605 |
| 3,705,344 A | * 12/1972 | Espen ........................ 318/654 |
| 4,491,772 A | 1/1985 | Bitting |
| 4,494,055 A | 1/1985 | Bitting et al. |
| 4,499,408 A | 2/1985 | Bitting et al. |
| 4,546,300 A | * 10/1985 | Shaikh ........................ 138/89 |
| 5,448,143 A | * 9/1995 | Pecone ....................... 318/434 |
| 6,163,117 A | 12/2000 | Rappenecker |

* cited by examiner

Primary Examiner—Jeffrey W. Donels
(74) Attorney, Agent, or Firm—Karl A. Vick, Esq.; Armstrong Teasdale LLP

(57) ABSTRACT

A method for utilizing a three-wire programming box with a motor control circuit is provided. The method includes providing a three-wire to two-wire interface. The method further includes connecting the three-wire to two-wire interface between the three-wire programming box and the motor control circuit such that the three-wire programming box communicates bi-directionally with the motor control circuit utilizing less than three connections between the three-wire to two-wire interface and the motor control circuit.

20 Claims, 5 Drawing Sheets

MOTOR CONTROL CIRCUIT

BACKGROUND OF INVENTION

This invention relates generally to dynamoelectric machines and, more particularly, to motor control circuits for an electronically commutated brushless direct current motor.

Dynamoelectric machines are utilized in many manufacturing applications. Dynamoelectric machine failures can cause lost production time, injury to personnel, and loss of capital equipment, all of which can reduce profitability. Therefore, a dynamoelectric machine manufacturer typically tests a motor before the motor leaves a production facility. An electronically commutated motor (ECM) typically includes a motor housing, a stator mounted to the housing, and a rotor shaft rotatably mounted within a bore of the stator. A rotor core is mounted on the rotor shaft and includes a plurality of permanent magnets. The stator includes a stator core including a plurality of electrically excitable windings. The stator windings generate a plurality of magnetic fields that oppose magnetic fields from the permanent magnets on the rotor. For the rotor to turn, the windings on the stator reverse polarity through commutation. A brushless commutator placed on one end of the rotor provides a signal to the stator windings to reverse polarity. In certain known ECMs, an integrated circuit times the switching of the electric currents to the stator. Frequently, a programmable chip is used with the brushless DC motor to provide multispeed capabilities. Typically, the programmable chip utilizes pulse width modulation (PWM) to control the speed of the motor.

Typically, the PWM input is applied through a two-wire interface in a control housing. The two-wire interface is unidirectional and does not provide feedback useful for testing purposes. Therefore, conventional motors also include a three wire bi-directional interface that a motor manufacturer uses for factory testing the motor. The three-wire interface is also in the control housing and from a customer perspective adds unnecessary lead wires to the control housing.

SUMMARY OF INVENTION

In one embodiment, a method for utilizing a three-wire programming box with a motor control circuit is provided. The method includes providing a three-wire to two-wire interface. The method further includes connecting the three-wire to two-wire interface between the three-wire programming box and the motor control circuit such that the three-wire programming box communicates bi-directionally with the motor control circuit utilizing less than three connections between the three-wire to two-wire interface and the motor control circuit.

In another embodiment, an interface circuit for interfacing with a motor control circuit including a first input circuit is provided. The interface circuit includes a three-wire to two-wire interface including a second input circuit electrically equivalent to the first input circuit of the motor control circuit.

In a further embodiment, a motor control and testing circuit includes a first input circuit, a second input circuit coupled to the first input circuit, and a microcontroller connected to the second input circuit. The circuit further includes a first output circuit coupled to the microcontroller, and a second output circuit coupled to the first output circuit. The second output circuit is connected to the first input circuit and is configured to send outputs from the microcontroller to the first input circuit.

In another embodiment, a motor control and testing circuit includes a first input circuit, a second input circuit coupled to the first input circuit, and a microcontroller connected to the second input circuit. The circuit further includes a first output circuit coupled to the microcontroller, and a second output circuit coupled to the first output circuit. The second output circuit is connected to the first input circuit and is configured to send outputs from the microcontroller to the first input circuit. The circuit further includes a third input circuit electrically equivalent to the first input circuit, and a comparator. The third input circuit and the first input circuit are connected to the comparator forming an impedance bridge.

In a further embodiment, an electrically commutated motor includes a housing, and a stator including a plurality of windings and a bore therethrough. The stator is mounted in the housing. The motor further includes a rotor shaft extending at least partially through the bore, and a rotor core mounted on the rotor shaft. The rotor core includes a plurality of magnets. The motor also includes a commutator connected to the windings, and a motor control and testing circuit connected to the commutator. The motor control and testing circuit includes a first input circuit, a second input circuit coupled to the first input circuit, and a microcontroller connected to the second input circuit. The motor control and testing circuit further includes a first output circuit coupled to the microcontroller, and a second output circuit coupled to the first output circuit. The second output circuit is connected to the first input circuit and is configured to send outputs from the microcontroller to the first input circuit.

DETAILED DESCRIPTION

Figure 1:
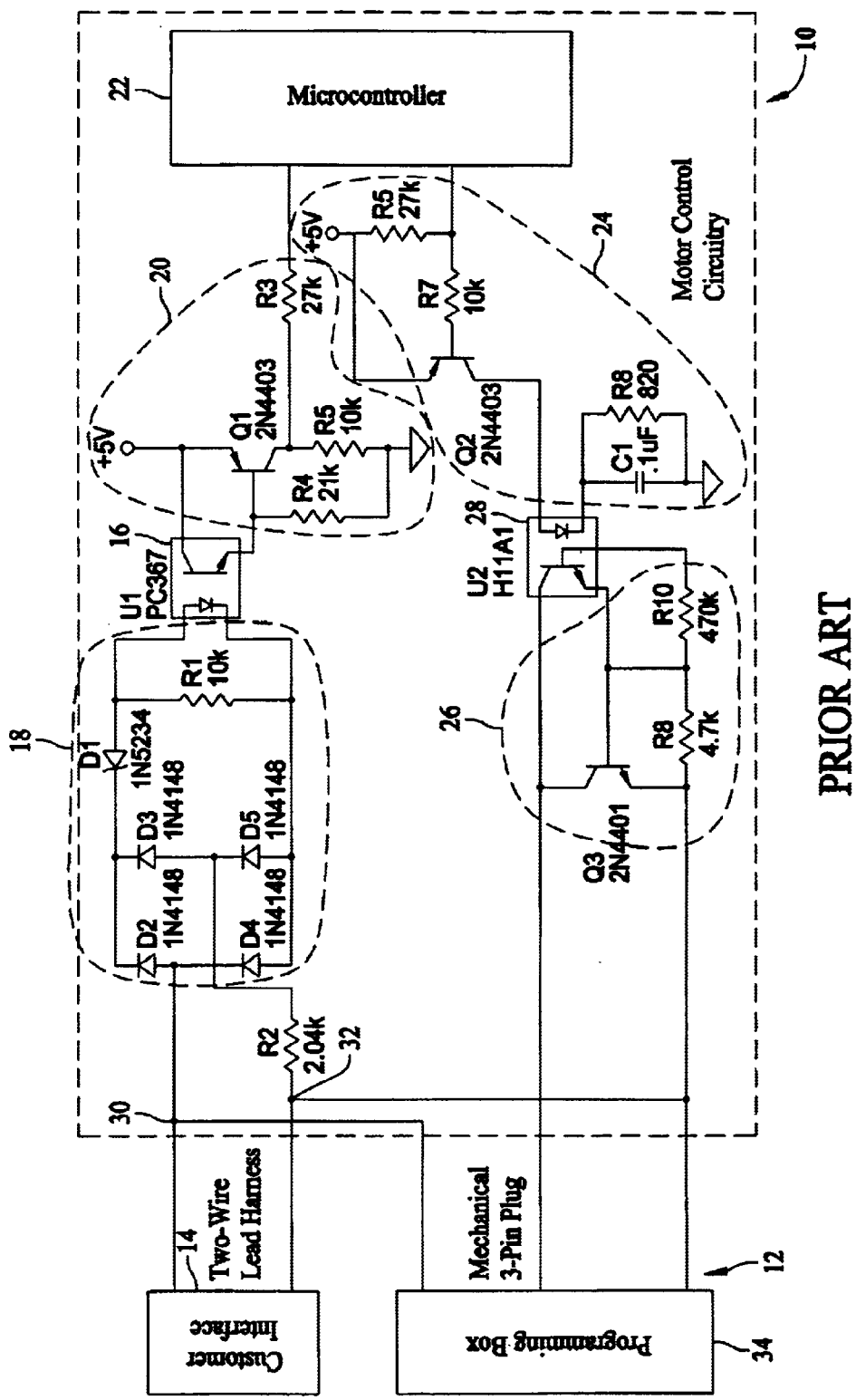
FIG. 1 is a schematic of a known motor control circuit.

FIG. 1 is a schematic of a known motor control circuit 10 including a three-wire interface 12 and a two-wire interface 14. Motor control circuit 10 is included within a motor housing (not shown) and both three-wire interface 12 and two-wire 14 are accessible from outside the housing. Three-wire interface 12 is bi-directional and is utilized by a motor manufacturer for factory testing purposes. Three-wire interface 12 is not used in typical motor applications and from a user's perspective is unnecessary. Rather, the typical motor application uses two-wire interface 14 to control a speed of a motor (not shown) controlled by motor control circuit 10. Circuit 10 includes a first optocoupler 16 optically coupling a diode bridge rectifier 18 with a DC input circuit 20 providing an input to a microcontroller 22. Microcontroller 22 outputs to a first output circuit 24 optically coupled to a second output circuit 26 by a second optocoupler 28. Additionally, three-wire interface 12 is connected to two-wire interface 14 at a first node 30 and a second node 32. Nodes 30 and 32 allow a factory programmer to program a programming box 34 at three-wire interface.

In use, an alternating current (AC) voltage signal is applied to diode bridge rectifier 18 that rectifies the signal before the signal is transmitted through optocoupler 16 and becoming a DC signal for DC input circuit 20. DC input circuit 20 inputs the DC signal to microcontroller 22, which controls the motor according to the DC signal as is known in the art.

During manufacture of a motor including control circuit 10, the motor is tested through the use of three-wire interface 12 and a mechanical three-pin plug (not shown). Three-wire interface 12 is electrically connected to two-wire interface 14 as shown in FIG. 1, and three-wire interface 12 is also connected to second output circuit 26. Therefore three-wire interface 12 is bi-directional in that a user receives feedback from the motor via second output circuit 26 while controlling the motor utilizing the connection to two-wire interface 14.

Figure 2:
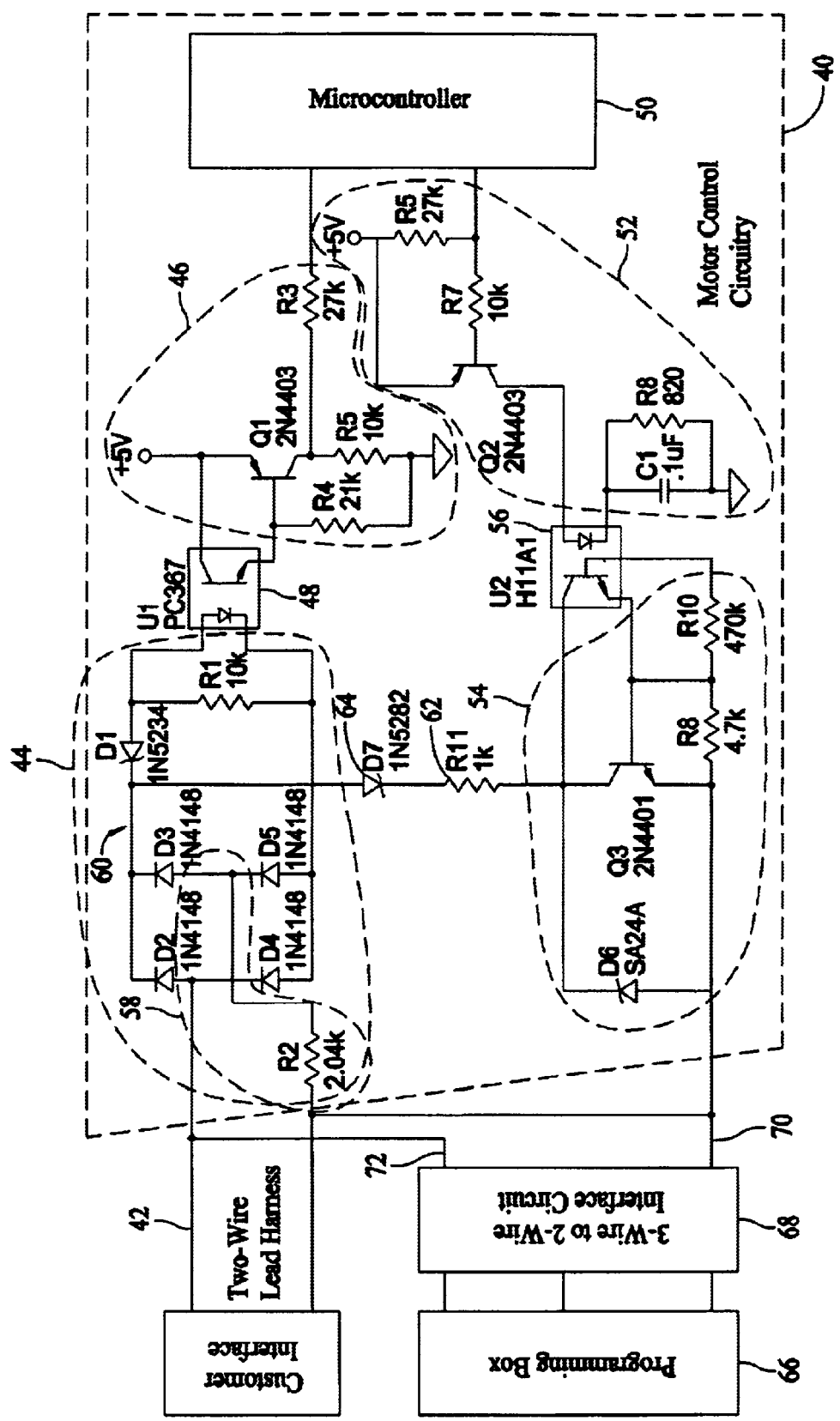
FIG. 2 is a schematic of a motor control circuit according to one embodiment of the invention.

FIG. 2 is a schematic of a motor control circuit 40 according to one embodiment of the invention. Motor control circuit 40 includes a two-wire interface 42 connected to a first input circuit 44 which is optically coupled to a second input circuit 46 by a first optocoupler 48. In one embodiment, first input circuit 44 is a diode bridge rectifier input circuit and hereinafter thus referred. Second input circuit 46 provides inputs to a microcontroller 50. Microcontroller 50 is connected to a first output circuit 52 which is optically coupled to a second output circuit 54 by a second optocoupler 56. As used herein, the term microcontroller is not limited to just those integrated circuits referred to in the art as microcontrollers, but broadly refers to microcontrollers, processors, computers, microcomputers, application specific integrated circuits, and other programmable circuits.

Diode bridge rectifier input circuit 44 includes an unrectified input 58 and a rectified output 60. Second output circuit 54 is connected to rectified portion 60 of diode bridge rectifier input circuit 44 by a resistor 62 and a Zener diode 64. A three-wire programming box 66 is connected to circuit 40 via a three-wire to two-wire interface 68. Motor control circuit 40 is mounted inside a motor (not shown in FIG. 2) and while two-wire interface 42 is accessible from exterior the motor, connections for programming box 66 are not accessible from exterior the motor as were connections for programming box 12 (shown in FIG. 1). Accordingly, a motor with circuit 40 has less lead wires extending from it than a motor with circuit 10 (shown in FIG. 1). Interface 68 is connected to second output circuit 54 and to two-wire interface 42. Interface 68 is connected to motor control circuit 40 at a first connection 70 and a second connection 72.

During operation of motor control circuit 40, a voltage signal is applied to diode bridge rectifier input circuit 44 via two-wire interface 42. Diode bridge rectifier input circuit 44 rectifies the AC signal before the signal is transmitted through optocoupler 48 forming a DC signal for second input circuit 46. Second input circuit 46 inputs the DC signal to microcontroller 50, which controls a motor (not shown in FIG. 2) according to the DC signal as is known in the art.

During manufacture of the motor controlled by control circuit 40, the motor is not tested through the use of a mechanical three-pin plug because the connection to programming box 66 is not accessible from outside the motor. Rather, the motor is tested using two-wire interface 42 which is bi-directional due to resistor 62 and diode 64 connecting second output 54 to diode bridge rectifier input circuit 44 and due to interface 68 as explained below.

Figure 3:
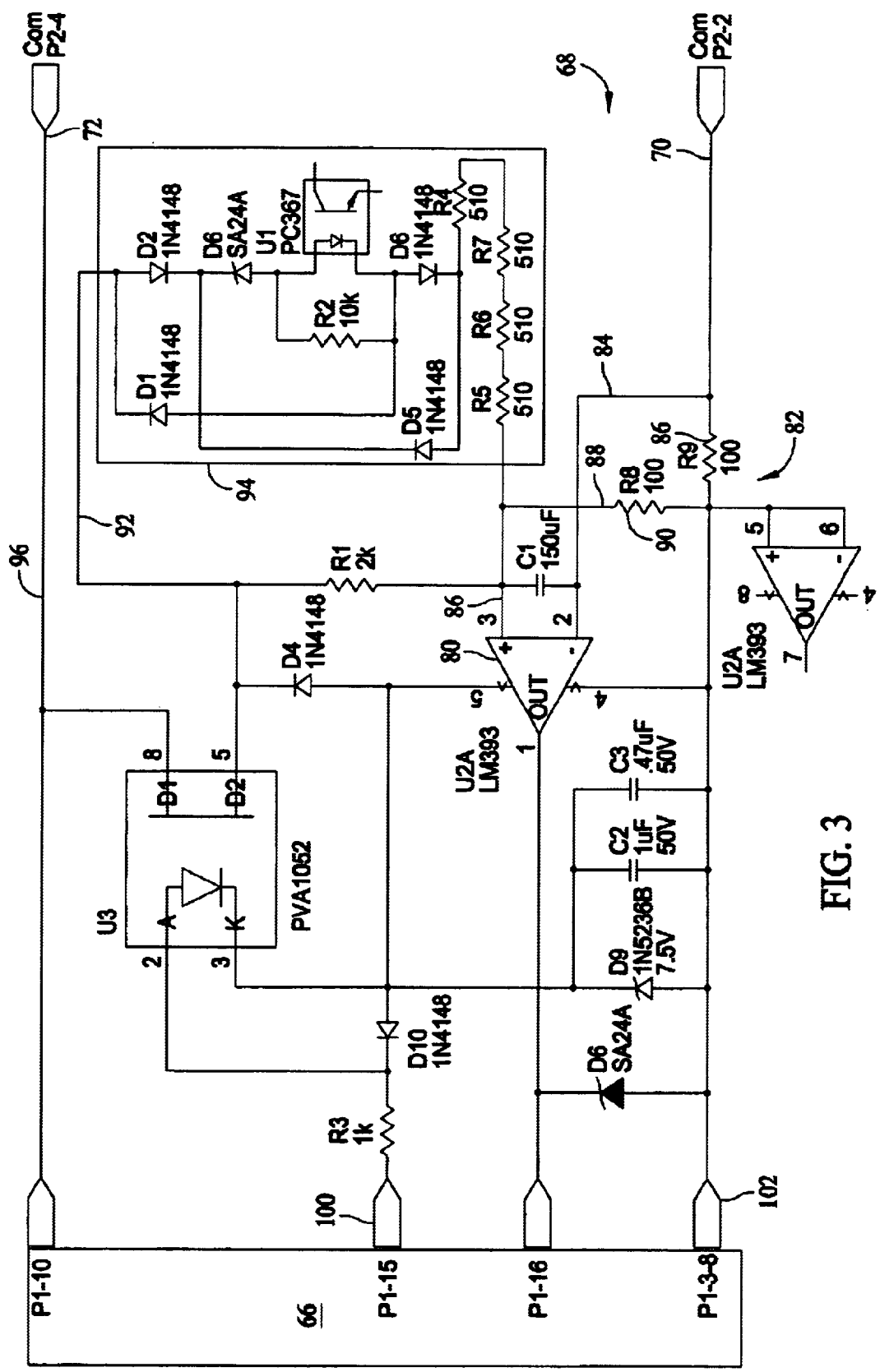
FIG. 3 is a schematic of the three-wire to two-wire interface shown in FIG. 2.

FIG. 3 is a schematic of three-wire to two-wire interface 68 (also shown in FIG. 2). Interface 68 includes a comparator 80 configured in an impedance bridge 82 including a first arm 84 including a first resistor 86, and a second arm 88 including a second resistor 90. First resistor 86 and second resistor 90 are substantially the same resistance. Impedance bridge 82 further includes a third arm 92 including a circuit 94 which is electrically equivalent to diode bridge rectifier input circuit 44 (shown in FIG. 2). Impedance bridge 82 also includes a fourth arm 96 that is connected to diode bridge rectifier input circuit 44 (shown in FIG. 2) via connections 70 and 72. Comparator 80 includes an output 98 that is connected to programming box 66.

In use, programming box 66 varies a voltage across a first pin 100 and a second pin 102 which are connected to both diode bridge rectifier input circuit 44 and to circuit 94. An output of comparator 80 reflects an output of microcontroller 50 regardless of the status of diode bridge rectifier input circuit 44 because bridge 82 acts to change a reference level of comparator 80 to effectively filter out input circuit 44 utilizing circuit 94 which is electrically equivalent to input circuit 44. In other words, comparator 80 compares the status of circuit 94 with the status of circuit 44 and the difference represents the contribution to the status of circuit 44 from microcontroller 50 fed into circuit 44 via resistor 62 and Zener diode 64 (shown in FIG. 2).

Figure 4:
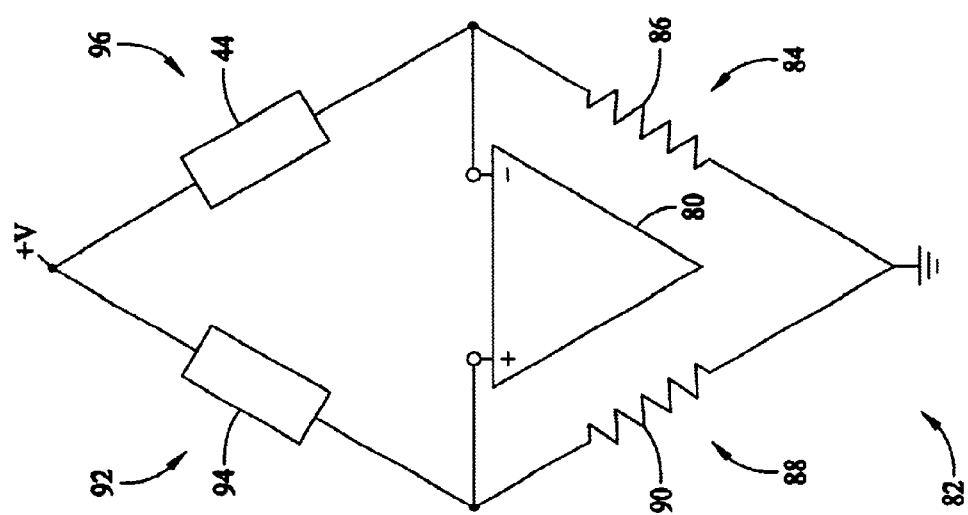
FIG. 4 is a schematic of the impedance bridge shown in FIG. 3.

FIG. 4 is a schematic of impedance bridge 82 (also shown in FIG. 3) including first arm 84 including first resistor 86, and second arm 88 including second resistor 90. As explained above, impedance bridge 82 also includes third arm 92 including circuit 94, and fourth arm 96 including circuit 44. Comparator 80 compares circuit 94 with circuit 44, and outputs the contribution to circuit 44 from microcontroller 50.

Figure 5:
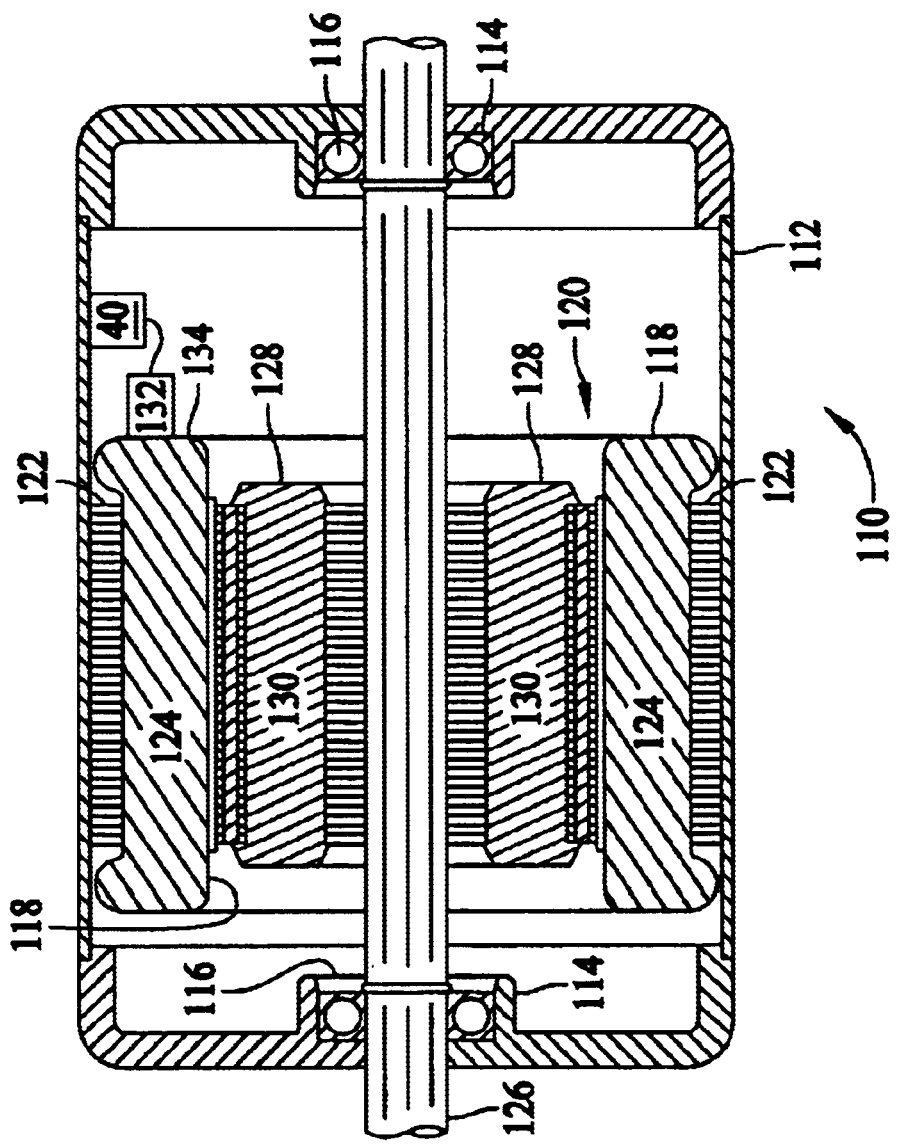
FIG. 5 is a cross sectional view of a motor including the motor control circuit shown in FIG. 2.

FIG. 5 is a cross sectional view of a motor 110 including motor control circuit 40 (shown in FIG. 2). Motor 110 includes a housing 112 and two endshields 114 mounted to housing 112. Endshields 114 include a plurality of bearings 116. Motor 110 further includes a stator 118 having a bore 120 therethrough. Stator 118 is mounted to housing 112 via a back iron 122, and includes a plurality of stator windings 124. A rotor shaft 126 is mounted within bearings 116 and extends through bore 120. A rotor core 128 is mounted on rotor shaft 122 and includes a plurality of permanent magnets 130. A brushless commutator 132 is placed on an end 134 of stator and is connected to motor control circuit 40. Brush commutator 132 reverses polarity of stator windings 124 when directed by microcontroller 50 and, thus controls the speed of motor 110.

While the invention has been described in terms of various specific embodiments, those skilled in the art will recognize that the invention can be practiced with modification within the spirit and scope of the claims.

What is claimed is:

1. A method for utilizing a three-wire programming box with a motor control circuit, said method comprising the steps of:
   providing a three-wire to two-wire interface; and
   connecting the three-wire to two-wire interface between the three-wire programming box and the motor control circuit such that the three-wire programming box communicates bi-directionally with the motor control circuit utilizing less than three connections between the three-wire to two-wire interface and the motor control circuit.

2. A method according to claim 1 wherein said step of providing a three-wire to two-wire interface comprises the step of providing a three-wire to two-wire interface including a circuit electrically equivalent to an input circuit of the motor control circuit.

3. A method according to claim 1 wherein said step of providing a three-wire to two-wire interface comprises the step of providing a three-wire to two-wire interface including a circuit electrically equivalent to a diode bridge rectifier input circuit of the motor control circuit.

4. A method according to claim 1 wherein said step of providing a three-wire to two-wire interface comprises the step of providing a three-wire to two-wire interface including a circuit electrically equivalent to an input circuit of the motor control circuit, wherein the circuit is connected to a comparator in an impedance bridge with the input circuit.

5. A method according to claim 1 wherein said step of providing a three-wire to two-wire interface comprises the step of providing a three-wire to two-wire interface including a circuit electrically equivalent to a diode bridge rectifier input circuit of the motor control circuit, wherein the circuit is connected to a comparator in an impedance bridge with the input circuit.

6. An interface circuit for interfacing with a motor control circuit including a first input circuit comprising an input coupled to a two wire bi-directional interface and an output configured to couple to at least one of an input of a second input circuit and an input of an output circuit, said interface circuit comprising a three-wire to two-wire interface comprising a second input circuit that includes an input configured to receive an output of said first input circuit and an output configured to transmit inputs to a microcontroller to control a motor, said second input circuit electrically equivalent to the first input circuit of the motor control circuit.

7. A circuit according to claim 6 further comprising a comparator connected to both said second input circuit and the first input circuit.

8. A circuit according to claim 7 wherein said comparator connected to both said second input circuit and the first input circuit forming an impedance bridge.

9. A circuit according to claim 6 wherein said second input circuit comprises a diode bridge rectifier.

10. A circuit according to claim 8 wherein said second input circuit comprises a diode bridge rectifier.

11. A motor control and testing circuit comprising:
    a first input circuit comprising an input configured to couple to a two wire bi-directional interface and an output configured to couple to at least one of an input of a second input circuit and an input of an output circuit;
    a second input circuit coupled to said first input circuit, said second input circuit includes an input configured to receive an output of said first input circuit output;
    a microcontroller input connected to an output of said second input circuit;
    a first output circuit input coupled to an output of said microcontroller; and
    a second output circuit input coupled to an output of said first output circuit, said second output circuit connected to said first input circuit and configured to send outputs from said microcontroller to said first input circuit.

12. A circuit according to claim 11 further comprising a three-wire to two-wire interface circuit connected to said first input circuit, said three-wire to two-wire interface circuit comprising a third input circuit electrically equivalent to said first input circuit.

13. A circuit according to claim 11 further comprising a three-wire to two-wire interface circuit connected to said first input circuit, said three-wire to two-wire interface circuit comprising:
    a third input circuit electrically equivalent to said first input circuit; and
    a comparator, said third input circuit and said first input circuit connected to said comparator forming an impedance bridge.

14. A circuit according to claim 13 wherein said third input circuit comprises a diode bridge rectifier circuit.

15. A circuit according to claim 11 wherein said second input circuit coupled to said first input circuit with an optocoupler, said second output circuit coupled to said first output circuit with an optocoupler, said second output circuit connected to said first input circuit by a Zener diode at a rectified output of said first input circuit.

16. A motor control and testing circuit comprising:
    a first input circuit comprising an input configured to couple to a two wire bi-directional interface and an output configured to couple to at least one of an optocoupler and an output circuit;
    a second input circuit coupled to said first input circuit, said second input circuit includes an input configured to receive an output of said optocoupler;
    a microcontroller input connected to an output of said second input circuit;
    a first output circuit input coupled to an output of said microcontroller;
    a second output circuit input coupled to an output of said first output circuit, said second output circuit connected to said first input circuit and configured to send outputs from said microcontroller to said first input circuit;
    a third input circuit comprising an input configured to couple to said two wire bi-directional interface, said third input circuit being electrically equivalent to said first input circuit; and
    a comparator comprising an input coupled to an output of said third input circuit and an output of said first input circuit, said third input circuit and said first input circuit connected to said comparator forming an impedance bridge.

17. A circuit according to claim 16 wherein said third input circuit comprises a diode bridge rectifier circuit.

18. An electrically commutated motor comprising:
    a housing;
    a stator comprising a plurality of windings and a bore therethrough, said stator mounted in said housing;
    a rotor shaft extending at least partially through said bore;
    a rotor core mounted on said rotor shaft, said rotor core comprising a plurality of magnets;
    a commutator connected to said windings; and
    a motor control and testing circuit connected to said commutator, said motor control and testing circuit comprising:
        a first input circuit comprising an input configured to couple to a two wire bi-directional interface and an output configured to couple to at least one of an input of a second input circuit and an input of an output circuit;
        a second input circuit comprising an input that is coupled to an output of said first input circuit;
        a microcontroller input connected to an output of said second input circuit;
        a first output circuit input coupled to an output of said microcontroller;

a second output circuit input coupled to an output of said first output circuit, an output of said second output circuit connected to said first input circuit and configured to send outputs from said microcontroller to said first input circuit;

a third input circuit comprising an input configured to couple to said two wire bi-directional interface, said third input circuit being electrically equivalent to said first input circuit, and a comparator comprising an input coupled to an output of said third input circuit and an output of said first input circuit, said comparator connected to said first input circuit and said third input circuit forming an impedance bridge.

19. A motor according to claim 18 wherein said third input circuit comprises a diode bridge rectifier circuit.

20. A motor according to claim 18 wherein said second input circuit coupled to said first input circuit with an optocoupler, said second output circuit coupled to said first output circuit with an optocoupler, said second output circuit connected to said first input circuit by a Zener diode at a rectified output of said first input circuit.

* * * * *